US007186205B2

(12) United States Patent
Lahr et al.

(10) Patent No.: US 7,186,205 B2
(45) Date of Patent: Mar. 6, 2007

(54) VEHICLE LIFT INTERLOCK

(75) Inventors: Jeremy A. Lahr, Columbia City, IN (US); Allyson K. Kreft, Fort Wayne, IN (US); Marilyn R. Miars, LaOtto, IN (US); Douglas R. Taylor, Fort Wayne, IN (US); Steve F. Wagester, Fort Wayne, IN (US); Gregory D. Bell, Matteson, IL (US)

(73) Assignee: International Truck Intellectual Property Compay, LLC, Warrenville, IL (US)

( * ) Notice: Subject to any disclaimer, the term of this patent is extended or adjusted under 35 U.S.C. 154(b) by 274 days.

(21) Appl. No.: 11/011,564

(22) Filed: Dec. 14, 2004
(Under 37 CFR 1.47)

(65) Prior Publication Data

US 2006/0124375 A1 Jun. 15, 2006

(51) Int. Cl.
*F16H 59/60* (2006.01)
(52) U.S. Cl. ........................................ 477/97
(58) Field of Classification Search ............... 477/97, 477/96; 414/921, 539; 340/433; 307/10–1
See application file for complete search history.

(56) References Cited

U.S. PATENT DOCUMENTS

| 5,128,651 | A | 7/1992 | Heckart |
| 5,158,419 | A | 10/1992 | Kempf et al. |
| 5,243,323 | A | 9/1993 | Rogers |
| 5,874,891 | A | 2/1999 | Lowe |
| 6,259,358 | B1 | 7/2001 | Fjordbotten |
| 2004/0051379 | A1 | 3/2004 | Turner et al. |

*Primary Examiner*—Dirk Wright
(74) *Attorney, Agent, or Firm*—Gerald W. Askow; Jeffrey P. Calfa; Susan L. Lukasik

(57) ABSTRACT

An interlock for a vehicle platform lift meets the Federal Motor Vehicle Safety Standards (FMVSS 403) effective in late 2004 with minimum modification of vehicle electronic control arrangements. The interlock prevents forward and rearward mobility of vehicles unless the platform lift is stowed. The interlock operates to prevent accidental release but does not affect vehicle movement when the platform lift is stowed. Operation of the lift is allowed by placing the transmission in park or by placing the transmission in neutral and actuating the parking brake. A vehicle body computer controls operation when the vehicle is running. A bypass enable relay allows use when the vehicle's engine is not running.

14 Claims, 3 Drawing Sheets

VEHICLE LIFT INTERLOCK

BACKGROUND OF THE INVENTION

1. Technical Field

The invention relates to interlocks for vehicle platform lifts.

2. Description of the Problem

Federal Motor Vehicle Safety Standards (FMVSS 403) which come into effect in late 2004 require interlocks to prevent forward and rearward mobility of vehicles unless the platform lift is stowed. These interlocks must discourage accidental release and not affect vehicle movement when the platform lift is stowed. Operation of the lift may be permitted with the interlock inhibiting forward and rearward movement of the vehicle, which is to be done by placing the transmission in park or by placing the transmission in neutral and actuating the parking brake or vehicle service brakes by means other than the operator depressing the vehicle's service brake pedal.

SUMMARY OF THE INVENTION

According to the invention there is provided an interlock for a vehicle platform lift. The interlock is based on logic implemented through a body computer and a set of enable and power relays. A wheelchair door switch having a state controlled by the position of a wheelchair door on the vehicle side is also provided. The body computer is coupled to sense the state of the wheelchair door switch. The body computer is further connected to a data network which transmits data to the body computer from a plurality of controllers coupled to the data network. The controllers report states for a parking brake, a transmission and the engine ignition status. The body computer is programmed to respond to an open state of the wheelchair door, the parking brake being set and the transmission being in park or neutral for generating an enable signal. The enable signal is applied to a first enable relay for energizing the first enable relay. The interlock further includes a vehicle ignition switch having keyon and keyoff positions. A second enable relay is connected to the ignition switch for energization in response to placement of the ignition switch in the keyoff position. The vehicle platform lift is coupled to a power relay for receiving vehicle power. The power relay state is in turn controlled by either of the enable relays. The power relay has a high side input connected to the first and second enable relays and a low side input connectable to ground through the wheelchair door switch.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
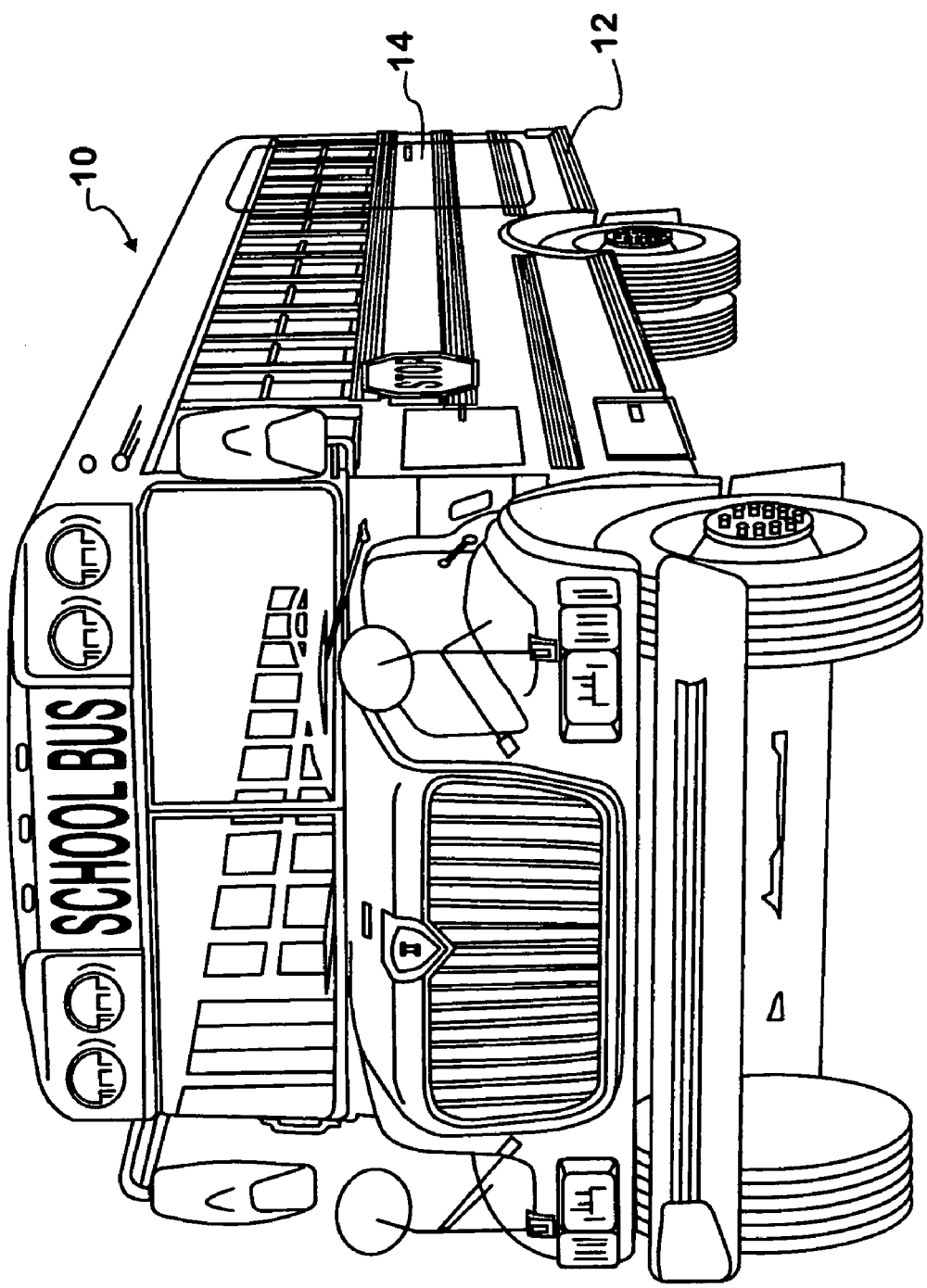
FIG. 1 is a perspective view of a bus to which the present invention is advantageously applied.

Referring to FIG. 1, a school bus 10 having a body 12 and a side or wheelchair access door 14 through the body is shown. A conventional platform lift (not shown) is used to load and unload wheelchairs from school bus 10. The lift may be extended from side door 14 when the side door is opened. Side door 14 must be opened to use the platform lift and the interlock of the present invention includes a switch operated by movement of the door.

Figure 2:
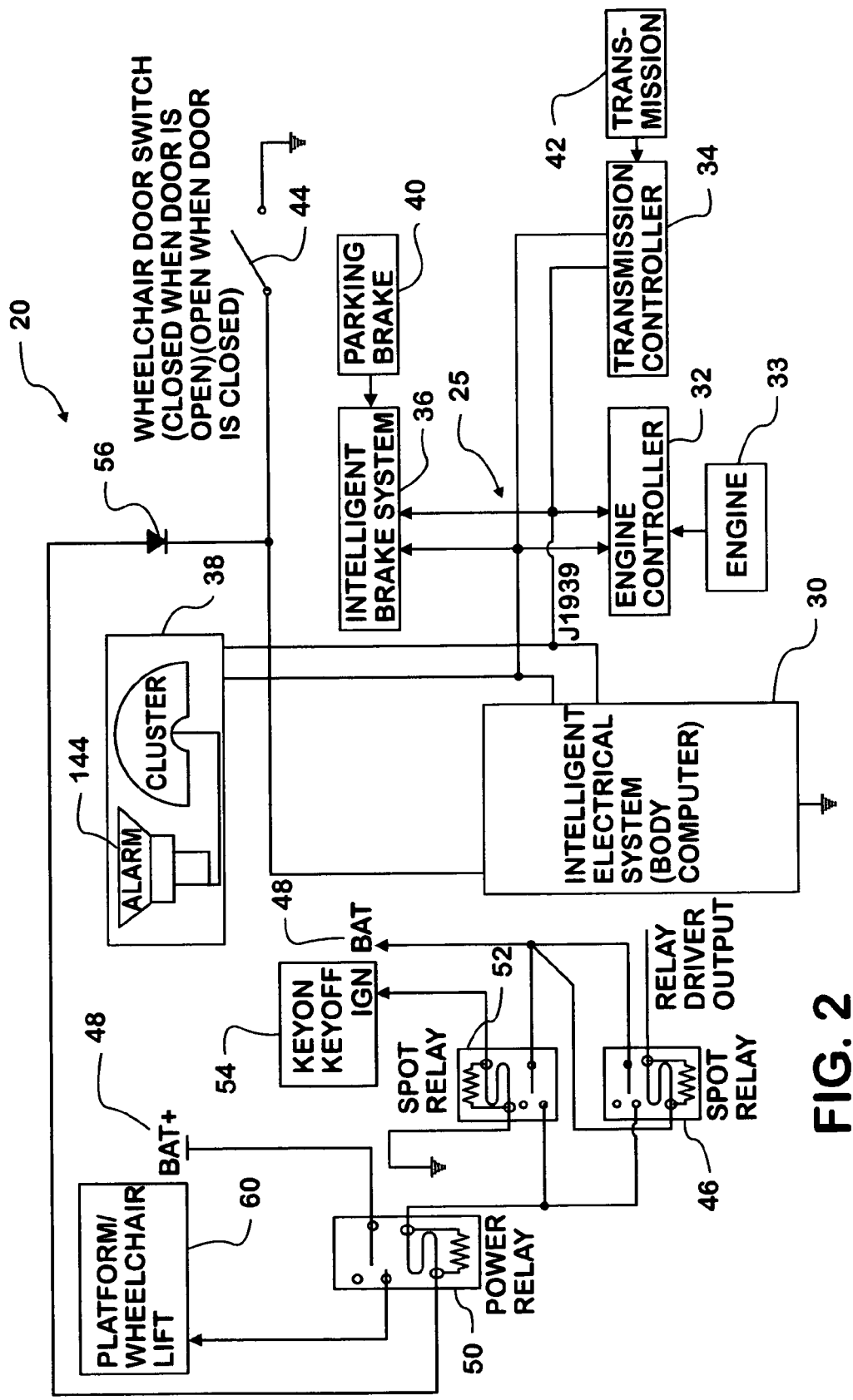
FIG. 2 is a block diagram of the interlock circuit for a platform lift system.

Referring now to FIG. 2, a block diagram of the vehicle platform lift interlock 20 is illustrated. In its preferred form, platform lift interlock 20 incorporates intelligent control capabilities which have become increasingly popular in motor vehicles of the early $21^{st}$ century. The term "intelligent control capabilities" refers to the use of control modules/controllers associated with major body systems and a network to link various control modules with one another and with a programmable body computer. As illustrated here, an SAE J1939 controller area network (CAN) 25, comprising a twisted pair of wires and built in CAN controllers for various controllers, provides for data exchange between the controllers and a body computer 30. Only those controllers involved in implementing the interlock are illustrated. These include an engine controller 32, a transmission controller 34, an intelligent brake system or brake system controller 36 (typically an anti-lock brake system (ABS) controller) and a instrument and gauge system cluster controller 38. Intelligent brake system controller 36 monitors the status of parking brake 40, which reports the status as a standard message type over the bus 25 for detection by body computer 30. Transmission controller 34 similarly reports the status of transmission 42 over the J1939 bus 25. This signal is typically intended for the engine controller 32, which passes it by way of the bus to body computer 30. Body computer 30 also transmits messages over bus 25, particularly a signal to instrument and gauge cluster controller 38 for activating an alarm under certain circumstances as spelled out below.

Body computer 30 includes output ports which allow the direct attachment of the body computer to devices requiring power and the body computer includes input ports allowing it to detect the state of switches connected to the body computers input ports. One such switch connected directly to a body computer 30 input port is a wheelchair door switch 44 which pulls the port to ground when the switch is closed. Body computer 30 is programmed to associate a low or grounded signal on the port with a door open condition.

The simplest case of operation does not involve body computer 30. A wheelchair lift mechanism 60 incorporates the motor, motor and valve control circuitry and lift mechanism. Power is available to the wheelchair lift mechanism 60 if the ignition 54 is in its keyoff position. Moving ignition 54 to the keyoff position results in the high side input of single pole double throw relay 52 going low, which in turn results in relay 52 closing and allowing power to be coupled from battery 48 through relay 52 to the high side input of power relay 50. If switch 44 is simultaneously closed, then the low side input of power relay 50 is pulled to ground through diode 56, which is connected between the low side input and switch 44. This energizes relay 50 resulting in battery power being available to wheelchair lift mechanism 60 through relay 50. Opening door switch 44 (which occurs when the door 14 is closed) deenergizes power relay 50 and opens the power relay, which interrupts power to the wheelchair lift mechanism 60.

When the ignition 54 is in the keyon position body computer 30 controls the application of power to wheelchair lift mechanism 60 through relays 46 and 50. Body computer 30 determines from signals received over J1939 compliant CAN bus 25 and an input port connected to wheelchair door switch 44 if the conditions required for permitting operation of the wheelchair lift 60 are met. Firstly, transmission 42 must be in neutral. The status of transmission 42 is reported over CAN bus 25 by transmission controller 34, picked up by the engine controller 32 and reformatted for receipt by the body computer 30. Those skilled in the art will of course realize that the body computer 30 may be programmed to detect the output of the transmission controller 34 directly, however, in some vehicles, the transmission controller may communicate over a private bus to the engine controller rather than transmitting over a public bus 25. Engine controller 32 also reports engine 33 ignition status to body computer 30. Parking brake 40 is required to beset. In the preferred embodiment the status of the parking brake 40 is determined by the intelligent brake system controller 36, and is reported over CAN bus 25. In some vehicles parking brake status is fed directly to a body computer 30. Finally, the body computer input from switch 44 must be pulled low by closure of the switch. With all of the conditions met body computer 30 will connect its relay driver output port to ground energizing relay 46. Body computer 30 is also programmed to activate an alarm 144 under the control of instrument and gauge cluster controller 38 should an attempt be made to operate the wheelchair lift mechanism 60 without first meeting the selected conditions.

Relay 46 is connected with its high side input connected to battery 48 and its low side input to the relay driver output port of body computer 30. Energization of relay 46 results in the relay connecting battery 48 to the high side input of power relay 50. Operation of the power relay 50 does not depend upon whether its high side is connected to battery power through relay 46 or relay 52. Power relay 52 operates to connect the input of wheelchair lift mechanism 60 to vehicle power as already described.

Figure 3:
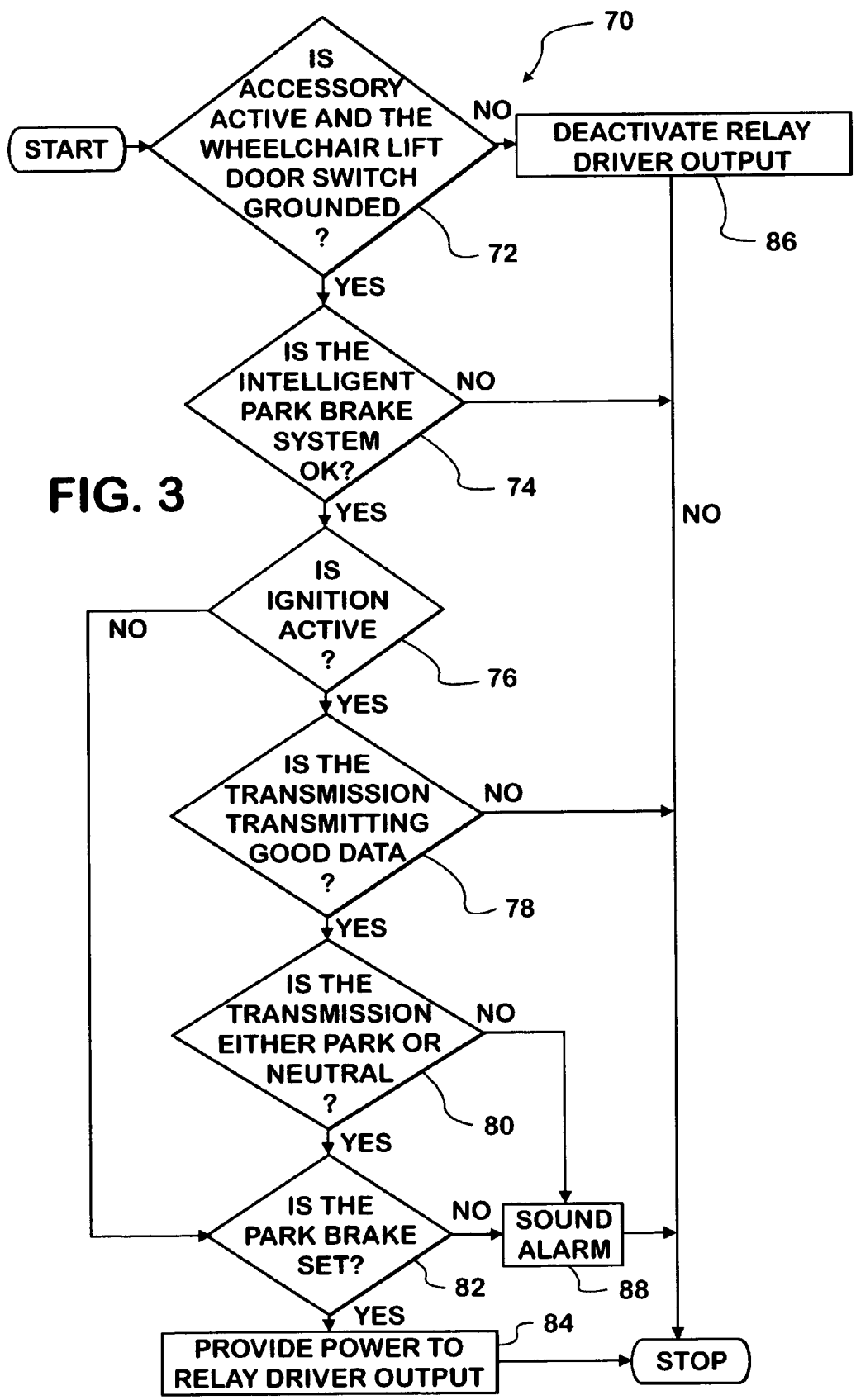
FIG. 3 is a flow chart illustrating the logic implemented using a body computer interacting with the circuitry of the interlock system.

Referring to FIG. 3 a flow chart is used to describe the interlock routine 70 implemented by the programming of body computer 30 and the associated relay circuitry. Interlock routine 70 is involved when the vehicle is powered. An attempt to operate wheelchair lift mechanism 60 invokes decision step 72, which looks the status of the wheelchair door switch 44. It the door 14 is closed (i.e. switch 44 open) the NO branch is followed to step 86 which provides for deactivating the relay driver output of body computer 30 and exit from the routine. Where the door 14 is opened and switch 44 closed, the YES branch is followed from decision step 72 to decision step 74. Step 74 looks for the presence of an acceptable status report from the intelligent brake system controller 36. It the report is not present, the routine is exited. If the report is present the YES branch is followed to step 76 where ignition status as reported by the engine controller is checked. If the engine is not running the status of the transmission is unimportant and steps 78 and 80 relating to transmission status may be omitted. If the ignition status is high, steps 78 and 80 are executed to determine if the transmission controller is transmitting good data and is it reporting the status of the transmission to be either in park or in neutral. If transmission data is not good the routine is exited. If the transmission is not in the proper state an alarm is sounded (step 80) before the routine is exited. Following the YES branch from step 80 (transmission status in park/neutral) or the NO branch from step 76 (ignition not active) step 82 is executed to determine if the park brake has been set. If not, step 88 is executed to issue an alarm and the routine is exited. If the park brake has been set the relay driver output of body computer 30 is coupled to ground before the routine is exited.

The invention meets the interlock requirements of the federal motor vehicle safety standards with a minimum of modification of existing vehicle control electronics.

While the invention is shown in only one of its forms, it is not thus limited but is susceptible to various changes and modifications without departing from the spirit and scope of the invention.

What is claimed is:

1. A platform lift interlock for a motor vehicle comprising:
   a vehicle data network;
   a brake system controller and a parking brake, the brake system controller being coupled to the parking brake for reporting the state of a parking brake over the vehicle data network;
   a transmission controller and a transmission, the transmission controller being coupled to the transmission for obtaining the state thereof and for reporting the state of the transmission over the vehicle data network;
   a body computer coupled to the vehicle data network for receiving the signals relating to the states of the transmission and the parking brake, the body computer being further programmed to generate a platform lift enable signal in one of two states responsive to the signals relating to the states of the transmission and the parking brake; and
   a first enable relay coupled for energization to the body computer for receiving the enable signal.

2. A platform lift interlock as claimed in claim 1, further comprising:
   an ignition switch with keyon and keyoff positions;
   a second enable relay coupled to the ignition switch for energization responsive to positioning of the ignition switch in its keyoff position;
   a power relay connected to the outputs of the first and second enable relays for energization responsive to energization of either the first or the second enable relays; and
   a lift mechanism connected to receive power through the power relay.

3. A platform lift interlock as claimed in claim 2, further comprising:
   a wheelchair door lift switch coupled to a low side input of the power relay for connecting the low side input to ground upon closure;
   the wheelchair door lift switch being further connected to an input on the body computer; and
   the body computer being further programmed to emit an enable signal in one of two states responsive to the state of the wheelchair door lift switch.

4. A platform lift interlock as claimed in claim 3, further comprising:
   an engine controller coupled to the vehicle data network for reporting an engine ignition state over the vehicle data network; and
   the body computer being further programmed for controlling the state of the enable signal responsive to the state of the engine ignition signal.

5. A platform lift interlock as claimed in claim 4, further comprising:
  a gauge and instrument cluster controller coupled to the vehicle data network;
  an alarm connected to the gauge and instrument cluster controller; and
  the body computer being further programmed to cause the gauge and instrument cluster controller to activate the alarm in response to a selected combination of states of the signals relating to the states of the parking brake and transmission controller occurring simultaneously with an attempt to activate the wheelchair platform lift mechanism.

6. A vehicle comprising:
  a wheelchair door;
  a wheelchair door switch having a state controlled by the position of the wheelchair door;
  a body computer coupled to sense the state of the wheelchair door switch;
  a data network connected to the body computer;
  a plurality of controllers coupled to the data network for reporting states including the state of a parking brake and the state of a transmission over the data network;
  the body computer being programmed to respond to an open state of the wheelchair door, the parking brake being set and the transmission being park or neutral for generating an enable signal;
  a first enable relay connected to the body computer for receiving the enable signal;
  an ignition switch;
  a second enable relay connected to the ignition switch for energization in response to placement of the ignition switch in a keyoff position;
  a platform lift mechanism; and
  a power relay having a high side input connected to the outputs from the first and second enable relays, a low side input connectable to ground through the wheelchair door switch and a power output connected to the platform lift mechanism.

7. A vehicle as claimed in claim 6, further comprising:
  a gauge and instrument cluster controller coupled to the data network;
  an alarm coupled to the gauge and instrument controller for activation upon signal from the body computer to the instrument and gauge controller; and
  the body computer being programmed to respond to selected combinations of states reported relating to the transmission and parking brake combined with an attempt to use the platform lift for causing the gauge and instrument controller to issue an signal over the alarm.

8. A vehicle as claimed in claim 7, further comprising:
  a diode coupling the low side input of the power relay to the wheelchair door switch.

9. A vehicle as claimed in claim 7, further comprising:
  an engine;
  an engine controller coupled to the engine for reporting engine ignition status over the data network; and
  the body computer being further programmed for providing an enable signal to the first enable relay in response to engine ignition status indicating the engine is not running.

10. An energization control system for a vehicle platform lift comprising:
  a power source;
  a power relay having high and low side inputs for connecting the power source to the vehicle platform lift;
  an ignition switch;
  an ignition enable relay connected to apply an energization signal to the high side input of the power relay, the ignition enable relay having an energization input connected to the ignition switch for connecting power through the ignition enable relay when the ignition switch is in a keyoff position;
  parking brake and transmission state signal sources;
  a state enable relay connected to apply an energization signal to the high side input of the power relay responsive to an enable relay drive signal; and
  an enable relay drive signal generator responsive to selected parking brake and transmission state signals for generating an enable signal for application to the state relay.

11. An energization control system as claimed in claim 10, the enable signal drive signal generator further comprising:
  a body computer having an output connected to the state enable relay;
  a transmission controller for providing the transmission state signal;
  a brake system controller for providing the parking brake state signal; and
  a controller area network linking the body computer with the transmission controller and the brake system controller for the exchange of data including the state signals.

12. An energization control system as claimed in claim 11, further comprising:
  the body computer being programmed to respond to the state signals for generating the enable relay drive signal responsive to selected states of the state signals.

13. An energization control system as claimed in claim 12, further comprising:
  a wheelchair door switch connected between ground and an input to the body computer and the low side input of the power relay; and
  the body computer being programmed to respond to the selected states of the parking brake, transmission and wheelchair door switch.

14. An energization control system as claimed in claim 13, further comprising:
  an engine controller connected to the data bus for providing an ignition state signal; and
  the body computer being programmed to respond to the state of the ignition state signal.

* * * * *